2,770,054
SIMULATED WATER INJECTION SYSTEM

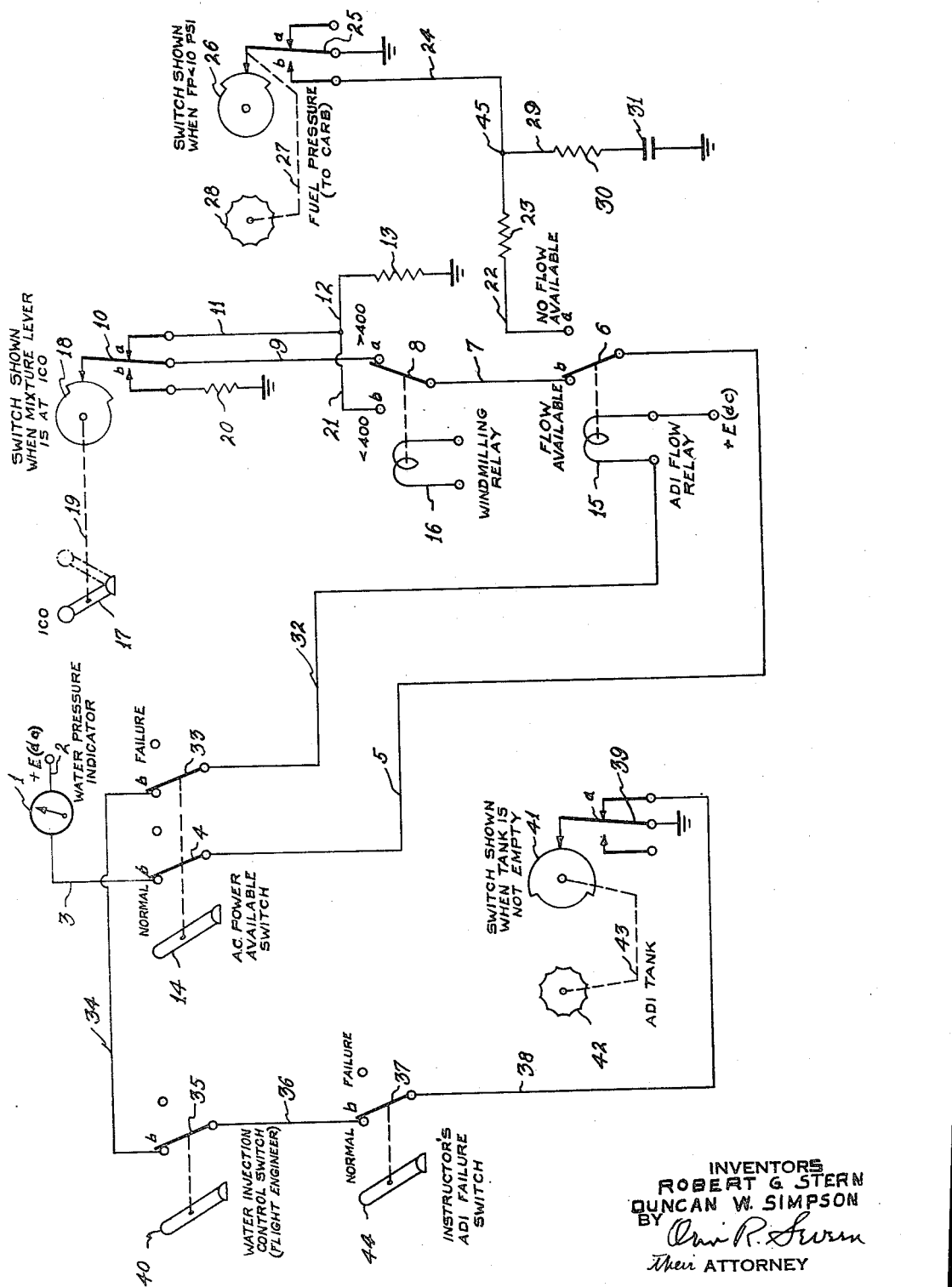

Robert G. Stern, West Caldwell, and Duncan W. Simpson, Wyckoff, N. J., assignors to Curtiss-Wright Corporation, a corporation of Delaware Application November 24, 1954, Serial No. 470,916

10 Claims. (Cl. 35—12)

My invention relates to ground based training apparatus for aircraft personnel. More particularly the invention relates to apparatus for simulating the operation of a water injection system for regulating the supply of water to the cylinders of an aircraft engine for preventing detonation.

Certain types of aircraft engines as for example the reciprocating engines of the B-36 (Air Force designation) are provided with a water injection system including a regulator for controlling the supply of water to the engine cylinders. Water is injected into the cylinders at a constant pressure as long as fuel is being supplied to the cylinders. In the event fuel pressure drops to zero as for example when the engineer's lever controlling the air fuel mixture is moved into an idle cut-off position or when engine R. P. M. is less than about 400 R. P. M. the regulator is effective to shut-off the water supply to the engine cylinders.

A pressure gauge in the water injection system measures water pressure during injection into the cylinders according to the air fuel mixture. If the supply of water to the cylinders is cut-off by the regulator a maximum reading is registered on the pressure indicator since the water pump at such time operates against a closed line. If, however, the water supply is exhausted at any time the pressure gauge by reason of the interconnection of fuel and water lines registers the pressure at which fuel is supplied to the cylinders. If pressure in the fuel supply line to the carburetor exceeds a pre-determined value a pressure indication in the amount of said predetermined value registers on the pressure gauge upon exhaustion of the water supply. If, however, pressure in the supply line to the carburetor is less than this pre-determined value the pressure indication gradually falls off to zero upon exhaustion of the water supply.

It is a prime object of my invention to provide a means for simulating the operation of a water injection system of the described type by registering on a simulated pressure gauge, pressure indications corresponding to the indications on the actual gauge in the aircraft during the operation of simulated aircraft controls.

The invention will be more fully set forth in the following description referring to the accompanying drawing, and the features of novelty will be pointed out with particularity in the claims annexed to and forming a part of this specification.

The drawing is a diagrammatic illustration embodying the features of my invention for simulating the operation of the water injection system of the described type.

Referring to the drawing, reference character 1 designates a simulated pressure gauge for registering water pressure or fuel pressure as the case may be according to conditions existing in the water injection system and simulated in the herein described apparatus. The simulated gauge 1 is a current instrument which is suitably calibrated to indicate pressure, the reading on the instrument depending on the current through the instrument and its energizing circuits. One energizing circuit for the simulated gauge 1 extends from the positive D. C. source +E(D. C.) over connection 2, through the instrument 1, over line 3, contact 4b, line 5, contact 6b, line 7, contact 8a, line 9, contact 10a, line 11, line 12, and resistor 13 to ground provided the A. C. power available switch 14 controlling the operation of contact 4b is in a normal position, the anti-detonation injection flow relay 15 controlling contact 6b is picked-up, windmilling relay 16 controlling contact 8a is released, and simulated air-fuel mixture lever 17 controlling the operation of contact 10a is in its idle cut-off position. When this energizing circuit is complete a pre-determined pressure reading is obtained on the simulated gauge 1 according to the magnitude of the resistor 13. If the mixture lever 17 is in other than the idle cut-off position the cam 18 which is operatively connected thereto by mechanical connections 19 is positioned such that the contact arm 10 is disposed to close the contact 10b rather than contact 10a, and provided other conditions are the same, namely, that contacts 4b, 6a and 8a are closed a different reading is on the simulated pressure gauge according to the magnitude of resistor 20. At such time an energizing circuit for the instrument 1 extends from the voltage source +E(D. C.) over connection 2, through instrument 1, over line 3, contact 4b, line 5, contact 6b, line 7, contact 8a, line 9, contact 10b, and resistor 20 to ground.

If the windmilling relay 16 is picked up contact 8b is closed and the instrument 1 for registering water pressure is energized over a circuit extending from the voltage source E(D. C.) over connection 2, through the instrument, over line 3, contact 4b, line 5, contact 6b, line 7, contact 8b, connection 21, connection 12 and resistor 13 to ground provided switch 14 is in its normal position and relay 15 is picked up. At such time the reading on instrument 1 is determined by resistor 13. The simulated pressure gauge may be provided with still another energizing circuit when the anti-detonation relay 15 is released and its contact 6a closed. Such energizing circuit extends from the supply voltage E(D. C.) over connection 2, through instrument 1, line 3, contact 4b, line 5, contact 6a, line 22 including resistor 23, and 24, and contact 25b to ground provided the switch 14 is in its normal position and the cam 26 which is controlled through mechanical connections 27 by the manual control 28 is disposed to position contact arm 25 such that contact 25b is closed. The control 28 may be positioned according to a supposed pressure in the fuel supply line to the carburetor of the aircraft. A position for the control 28 such that contact 25b is closed corresponds to a carburetor fuel pressure greater than a pre-determined amount as for example 10 lbs./sq. in. whereas a position for the control 28 such that contact 25a is closed corresponds to a carburetor fuel pressure less than the predetermined amount. A line 29 including resistor 30 and condenser 31 connected between line 24 and ground is provided to simulate a pressure leakage condition occurring upon exhaustion of the water supply when fuel pressure as represented by the position of control 28 is less than 10 lbs./sq. in.

The anti-detonation injection flow relay 15 hereinbefore referred to is controlled over a circuit which extends from the positive D. C. voltage source E (d. c.) over the relay coil, line 32, contact 33b, line 34, contact 35b, line 36, contact 37b, line 38, and contact 39a to ground. Contacts 33b and 37b which are controlled by the A. C. power available switch 14 and instructor's anti-detonation failure switch respectively are normally closed. The contact 35b is controlled by the simulated water injection control switch 40 which may be operated, for example by a student flight engineer and functions to open or close contact 35b when disposed in a position corresponding to the condition of the water injection system being turned off or on respectively. As shown contact 39a is controlled by the cam 41 which in turn is controlled by means of the manual control 42 through mechanical connections 43. The control 42 may be positioned by an instructor such that contact 39a is closed which condition corresponds to the existence of water in a water tank supplying the water injection system of the aircraft, or the control may be positioned such that contact 39a is open, the latter condition corresponding to the exhaustion of water from the water supply tank.

The apparatus may be operated to effectively simulate the operation of the water injection system provided the simulated water injection control switch 40 is positioned to close the contact 35b. If the manual control 42 has been disposed in a position corresponding to the presence of water in the water supply tank such that the contact 39a is closed and provided also that the instructor's anti-detonation failure switch 44 and the A. C. power available switch 14 are in their normal positions such that the contacts 37b and 4b respectively are closed the anti-detonation flow relay 15 is picked up over the circuit extending from the positive voltage source +E(d. c.) over the relay coil, line 32, contact 33b, line 34, contact 35b, line 36, contact 37b, line 38, and contact 39a to ground. The relay 15 is picked up and its contact 6b is closed. Assuming that the windmilling relay 16 is in a released condition corresponding to a R. P. M. greater than 400 such that the contact 8a is closed and the simulated mixture lever 17 is in the idle cut-off position such that contact 10a is closed an energizing circuit is complete for the instrument 1 extending from voltage source +E(d. c.) over connection 2, through the instrument 1, over line 3, contact 4b, line 5, contact 6b, line 7, contact 8a, line 9, contact 10a, line 11, line 12 and resistor 13 to ground. A reading is obtained on pressure gauge 1 according to the resistor 13 which is selected to provide a maximum indication. Such maximum indication reflects the condition in which the flow of water to the engine cylinders is cut-off which condition results when the air-fuel mixture lever in the aircraft is disposed in the idle cut-off position. A maximum indication is obtained at such time since the water pump operates against a closed line. If the simulated mixture lever 17 is placed in the rich mixture position so that the contact 10b is closed rather than contact 10a the energizing circuit for the pressure gauge 1 is completed over the contact 10b and the resistor 20 and a different indication according to the magnitude of the resistor 20 registers on the pressure gauge. Resistor 20 has a value somewhat greater than resistor 13 so that the pressure gauge reading corresponds to the condition in which water is injected into the cylinders, and the pressure reading is somewhat less than the aforesaid maximum indication.

The windmilling relay 16 as indicated hereinbefore is picked up when R. P. M. is less than a pre-determined amount as for example 400 R. P. M. and such relay may be controlled in a manner shown and described in the co-pending application of Robert G. Stern and William H. Dawson, Jr., for "Simulating Manifold Pressure System for Aircraft," Serial No. 436,478, filed June 14, 1954. When R. P. M. in the aircraft is less than the pre-determined value fuel to the carburetor is automatically cut off and as a result the water to the cylinders is also cut off by the regulator so that the water pump once again operates against a closed line and a maximum pressure reading is obtained. This condition is simulated when the windmilling relay is picked up since at this time the relay contact 8b is closed and an energizing circuit for the circuit gauge is completed over the resistor 13 without reference to the position of the simulated mixture lever. Such energizing circuit extends from voltage source +E(d. c.) over connection 2 through the instrument 1, over line 3, contact 4b, line 5, contact 6b, line 7, contact 8b, connection 21, line 12, and resistor 13 to ground.

The condition of the water supply tank being empty may be simulated by an instructor positioning the control 42 such that the cam 41 is operated to open contact 39a. In such event the energizing circuit for the anti-detonation flow relay 15 is opened and the relay releases to open its contact 6b, and close the contact 6a. Assuming that at such time the position of the control 28 is such that contact 25b is closed corresponding to a fuel pressure of more than 10 lbs./sq. in. in the supply line to the carburetor an energizing circuit is complete for instrument 1 extending from the voltage source +E(d. c.) over connection 2 through the instrument 1, over line 3, contact 4b, line 5, contact 6a, line 22 including the resistor 23, line 24, and contact 25b to ground. The pressure gauge which registers a reading according to the magnitude of resistor 23 which is selected to provide an indication corresponding to the critical value of fuel pressure in the supply line to the carburetor, namely 10 lbs./sq. in. The condition of fuel pressure in the supply line to the carburetor falling below the critical value is simulated by an instructor positioning the control 28 to open the contact 25b and close the contact 25a. With the contact 25b open current flows in the line 29 until the condenser 31 is fully charged and a potential is obtained at the junction 45 corresponding to the supply voltage +E(d. c.) at which time the pressure gauge assumes a zero reading. The pressure indication drops off gradually to this zero reading due to the time involved in charging the condenser. In this way a leakage of fuel pressure such as occurs in the fuel transfer line leading from the carburetor to the engine when the fuel pressure in the supply line to the carburetor falls below 10 lbs./sq. in. is simulated. The magnitude of the resistor 30 in line 29 is small in comparison to the resistor 23 so that the condenser discharges almost immediately in the event the contact 25b is closed directly connecting the junction 45 to ground potential and no appreciable effect is thereby produced on the pressure gauge 1. The pressure gauge in such event would merely once again register the pressure reading of 10 lbs./sq. in as determined by resistor 23.

As has been indicated the anti-detonation injection flow relay 15 may be caused to release when exhaustion of the water supply is simulated by operation of the control 42. The relay may also be released by operation of the instructor's anti-detonation failure switch 44 to open the contact 37b to thereby simulate a failure in the water injection system occasioned for example by a rupture in a water line or a failure of the water pump in which event the pressure gauge will operate to simulate the conditions described as when the contact 6a is closed. The relay may also be released by operation of the student flight engineer's simulated water injection control switch 40 to open the contact 35b thereby to simulate a shutdown of the water injection system in which event the pressure gauge will also operate to simulate the conditions described as when the contact 6a is closed. The actual pressure gauge in the aircraft is electrically controlled in accordance with water pressure and a power failure causes the instrument to run down to zero regardless of water pressure. This condition is duplicated in the simulated system by operation of the instructor's power available switch 14 to open contacts 4b and 33b, and thereby effect the de-energization of instrument 1 whereupon the instrument runs to zero. The relay 15 if picked up is released by reason of the opening of contact 33b.

It should be understood that this invention is not limited to specific details of construction and arrangement thereof herein illustrated, and that changes and modifications may occur to one skilled in the art without departing from the spirit of the invention.

What is claimed is:

1. In ground based training apparatus for aircraft personnel, means for simulating the operation of a water injection system comprising a simulated air-fuel mixture control, means operable for reflecting a simulated engine R. P. M. of less than a pre-determined amount, an instrument for indicating simualted pressure, means for controlling said instrument according to the position of said control and operation of said operable means, means operable to override the control of said instrument by the mixture control and said operable means for reflecting the exhaustion of the water supply for the water injection system, means operable to reflect fuel pressure in the carburetor supply line, means for controlling the operation of said instrument upon operation of the overriding means according to fuel pressure as reflected by the last-named operable means including timing means for gradual control of said instrument upon operation of the overriding means with the fuel pressure reflecting means operated to reflect less than a pre-determined pressure.

2. The combination as defined in claim 1 with the addition of instructor's control means for operating the overriding means to simulate a pump or water line failure.

3. The combination as defined in claim 1 with the addition of instructor's control means for disconnecting the pressure indicating instrument from all control means to simulate a power failure.

4. The combination as defined in claim 2 with the addition of other instructor's control means for disconnecting the pressure indicating instrument from all aforesaid control means to simulate a power failure.

5. In ground based training apparatus for aircraft personnel, means for simulating the operation of a water injection system comprising a simulated air-fuel mixture control, relay means operable for reflecting a simulated engine R. P. M. of less than a predetermined amount, an instrument for indicating simulated pressure, circuit means for operating said instrument according to the operation of said control and said relay means, means operable to override the control of said instrument by the mixture control and relay means for reflecting the exhaustion of the water supply for the water injection system, means operable to reflect fuel pressure in the carburetor supply line, circuit means for controlling the operation of said instrument upon operation of the overriding means according to fuel pressure as reflected by the last-named operable means including timing circuitry for gradual control of said instrument upon operation of the overriding means with the fuel pressure reflecting means operated to reflect less than a predetermined pressure.

6. In a simulated water injection system for ground based training apparatus for aircraft personnel, the combination of an instrument for indicating simulated pressure, means operable to reflect exhaustion of the water supply for the water injection system of the aircraft, circuit means for controlling operation of said pressure indicating instrument upon operation of said operable means including means operable to reflect fuel pressure in the carburetor supply line for controlling operation of the instrument according to said fuel pressure and timing circuitry for gradual control of said instrument upon operation of the operable means with the fuel pressure reflecting means operated to reflect less than a pre-determined pressure.

7. The combination as defined in claim 1 with the addition of student's control means for operating the overriding means to simulate a shutdown of the water injection system.

8. The combination as defined in claim 1 wherein it is provided that when the means operable for reflecting a simulated engine R. P. M. reflects less than the predetermined amount, the means for controlling the instrument is operable solely according to the position of said means for reflecting the simulated engine R. P. M. and is independent of the operation of the simulated air fuel mixture control.

9. The combination as defined in claim 1 wherein the means for controlling the operation of the instrument upon operation of the overriding means includes means for rapid control of the instrument upon changing of the operation of the fuel pressure reflecting means from the condition reflecting less than the predetermined pressure to the condition reflecting at least said predetermined pressure.

10. The combination as defined in claim 5 wherein the circuit means for controlling the operation of the instrument upon operation of the overriding means includes circuitry for rapid control of the instrument upon change of the operation of the fuel pressure reflecting means from a condition reflecting less than a predetermined pressure to a condition reflecting at least said predetermined pressure.

No references cited.